US009848627B2

(12) United States Patent
Ito et al.

(10) Patent No.: US 9,848,627 B2
(45) Date of Patent: Dec. 26, 2017

(54) METHOD FOR PRODUCING A NON-ALCOHOLIC BEVERAGE

(71) Applicant: ASAHI BREWERIES, LTD., Tokyo (JP)

(72) Inventors: Shinsuke Ito, Nagareyama (JP); Jun Kubota, Tokyo (JP)

(73) Assignee: ASAHI BREWERIES, LTD., Tokyo (JP)

( * ) Notice: Subject to any disclaimer, the term of this patent is extended or adjusted under 35 U.S.C. 154(b) by 0 days.

(21) Appl. No.: 15/592,493

(22) Filed: May 11, 2017

(65) Prior Publication Data

US 2017/0245526 A1    Aug. 31, 2017

Related U.S. Application Data

(62) Division of application No. 14/236,360, filed as application No. PCT/JP2011/077812 on Dec. 1, 2011, now abandoned.

(51) Int. Cl.
*A23L 2/56* (2006.01)
*C12C 5/02* (2006.01)

(52) U.S. Cl.
CPC ............... *A23L 2/56* (2013.01); *C12C 5/026* (2013.01); *A23V 2002/00* (2013.01)

(58) Field of Classification Search
CPC .. A23L 2/56; C12G 3/06; C12C 12/02; C12C 5/026
USPC ...... 426/592, 11, 29, 330.4, 534, 535, 330.3
See application file for complete search history.

(56) References Cited

U.S. PATENT DOCUMENTS

| 4,389,421 A | 6/1983 | Palamand |
| 5,346,706 A | 9/1994 | Murray et al. |
| 6,296,889 B1 * | 10/2001 | Ott .......................... A23F 5/465 426/534 |
| 2007/0128326 A1 | 6/2007 | Milo et al. |
| 2010/0015276 A1 | 1/2010 | Silaneskenny et al. |
| 2012/0021110 A1 | 1/2012 | Katayama et al. |

FOREIGN PATENT DOCUMENTS

| CN | 1874686 A | 12/2006 |
| CN | 101700110 A | 5/2010 |
| GB | 190112697 A | 0/1901 |
| GB | 2362891 A | 12/2001 |
| JP | 59179058 | 10/1984 |
| JP | 05068528 | 3/1993 |
| JP | 8228753 | 9/1996 |
| JP | 8509855 | 10/1996 |
| JP | 2007074926 | 3/2007 |
| JP | 2008245606 A | 10/2008 |
| JP | 2010183878 A | 8/2010 |
| JP | 2011024447 A | 2/2011 |
| JP | 2011142901 A | 7/2011 |
| JP | 2011223951 A | 11/2011 |
| WO | WO-2009078359 A1 | 6/2009 |
| WO | WO-2010079778 A1 | 7/2010 |

OTHER PUBLICATIONS

Katz, John 10 Coffee Beers That Pull Serious Double-Duty http://www.foodrepublic.com/2013/08/14/10-coffee-beers-that-pull-serious-double-duty/Aug. 14, 2013.*
International Search Report for PCT/JP2011/077812 dated Jan. 31, 2012.
Kishimoto, T. et al., "Odorants comprising hop aroma of beer: hop-derived odorants increased in the beer hopped with aged hops," Proceedings of the 31st EBC Congress, Venice 2007.
Komarek et al., "The Role of 3-Methyl-2-Butene-1-Thiol in Beer Flavor," Food Service and Technology, (Handbook of Flavor Characterization), 131:473-481 (2004).
Walker, "The Influence of Metal Ions on Concentrations of Flavour-Active Sulphur Compounds Measured in Beer Using Dynamic Headspace Sampling," *J Sci Food Agric.*, 67:25-28 (1995).
Bamforth, "Beer Flavour: Sulphur Substances", Brew Guard, vol. 130, No. 10, Oct. 2001, pp. 20-23.
Lipka et al., "Ingredient Profile: 3-Mercaptohexanol", Perfumer & Flavorist, vol. 36, No. 4, Apr. 2011, 1 page.
Ogawa et al., "Unique Approach to the Creation of Beer Flavor", Technical Journal on Food Chemistry & Chemicals, vol. 26, No. 6, Jun. 1, 2010, pp. 37-42.
Vinas et al., "Determination of Cadmium, Aluminum, and Copper in Beer and Products Used in its Manufacture by Electrothermal Atomic Absorption Spectrometry", Journal of AOAC International, vol. 85, No. 3, May 2002, pp. 736-743.
Office Action in JP Application No. 2013-252660 dated Dec. 8, 2014.
Office Action in CN Application No. 201180071314.5 dated Jan. 12, 2015.
Guangtian et al., "Beer Brewing Technology", Shandong University Press, Mar. 2004, 5 pages.
Yanping, "Food Seasoning Technologies", Chemical Industry Press, Sep. 30, 2010, 4 pages.
He et al., "Beer Science and Technology Determination and Separation of Metal Ions in Beer", Technical Center of Beijing Yanjing Beer Group Corporation, Jan. 2010, 5 pages.
Hough et al., "Malting and Brewing Science vol. II Hopped Wort and Beer", 2nd Edition, Chapman and Hall, 1982, p. 779.

* cited by examiner

*Primary Examiner* — Vera Stulii
(74) *Attorney, Agent, or Firm* — Marshall, Gerstein & Borun LLP

(57) ABSTRACT

To provide an unfermented beer-taste beverage provided with fermentation flavor, and a method for producing the unfermented beer-taste beverage.

An unfermented beer-taste beverage provided with good fermentation flavor characteristic of beer can be provided by a method for producing an unfermented beer-taste beverage comprising a step of adding a flavor composition containing a sulfur-containing compound to an unfermented beer-taste beverage to achieve a content of the sulfur-containing compound of $1\times10^2$ ppt or more but $1\times10^3$ ppt or less.

9 Claims, No Drawings

METHOD FOR PRODUCING A NON-ALCOHOLIC BEVERAGE

CROSS-REFERENCE TO RELATED APPLICATIONS

This is a division of U.S. application Ser. No. 14/236,360, which is the U.S. national phase of International Application No. PCT/JP2011/077812 filed Dec. 1, 2011, the entire respective disclosures of which are incorporated by reference herein.

TECHNICAL FIELD

The present invention relates to an unfermented beer-taste beverage provided with fermentation flavor, and a method for producing the unfermented beer-taste beverage.

BACKGROUND ART

Recently, beer-taste soft drinks (so-called, non-alcohol beer-taste beverages) have been widespread among consumers. The non-alcohol beer-taste beverages have alcohol contents of less than 1% by mass, and hence do not belong to alcoholic beverages of the Japanese Liquor Tax Law. Even when such a non-alcohol beer-taste beverage is ingested in a large amount to enjoy the beer taste, the total amount of alcohol ingested is small. Hence, the non-alcohol beer-taste beverages are suitable for water supply, and meet the needs of recent health oriented people (for example, see Japanese Patent Application Publication No. Hei 8-228753, Japanese Patent Application Publication No. Hei 8-509855, and Japanese Patent Application Publication No. Hei 5-068528).

Some of these non-alcohol beer-taste beverages are known to be produced by suppressing (insufficiently carrying out) the alcoholic fermentation in the production process, to thereby reduce the content of alcohol produced by the fermentation. Others (unfermented beer-taste beverages) are known to be produced by carrying out no fermentation at all, but providing a beer-like flavor by means other than fermentation. Here, in particular, the unfermented beer-taste beverages are advantageous in that the beer-taste beverage can be produced without need for any special fermentation apparatus, and now are widely marketed as beverages which can be taken even by consumers who will drive a car, under the stricter regulations against drunk driving.

SUMMARY OF INVENTION

However, most of the flavor of beer is originated from odor components produced during alcoholic fermentation by yeast. For this reason, it has been very difficult so far to provide a beer-like odor to an unfermented beer-taste beverage.

Accordingly, an object of the present invention is to provide an unfermented beer-taste beverage provided with fermentation flavor, and a method for producing the unfermented beer-taste beverage.

In view of the above object, the inventors of the present invention have conducted earnest study. As a result, the inventors have found that an unfermented beer-taste beverage provided with good fermentation flavor can be produced by a production method comprising a step of adding a flavor composition containing a sulfur-containing compound to an unfermented beer-taste beverage, so that the content of the sulfur-containing compound can be a predetermined concentration. This finding has led to the completion of the present invention.

Specifically, the present invention provides the following.

A first aspect of the present invention is a method for producing an unfermented beer-taste beverage comprising a step of adding a flavor composition containing a sulfur-containing compound to an unfermented beer-taste beverage to obtain a content of the sulfur-containing compound of $1 \times 10^2$ ppt or more but $1 \times 10^3$ ppt or less.

A second aspect of the present invention is an unfermented beer-taste beverage comprising a sulfur-containing compound at $1 \times 10^2$ ppt or more but $1 \times 10^3$ ppt or less.

In the present invention, a flavor composition containing a sulfur-containing compound is added to an unfermented beer-taste beverage, so that the content of the sulfur-containing compound can be a predetermined concentration. Hence, the present invention makes it possible to provide an unfermented beer-taste beverage provided with good fermentation flavor characteristic of beer.

DESCRIPTION OF EMBODIMENTS

Hereinafter, the present invention will be described in detail.

Method for Producing Unfermented Beer-Taste Beverage

A method for producing an unfermented beer-taste beverage of the present invention comprises a step of adding a flavor composition containing a sulfur-containing compound to an unfermented beer-taste beverage to achieve a content of the sulfur-containing compound of $1 \times 10^2$ ppt or more but $1 \times 10^3$ ppt or less.

Here, a general method for producing an unfermented beer-taste beverage is described first.

In the present invention, the unfermented beer-taste beverage is basically produced, without fermentation by yeast, by adding carbon dioxide gas to a liquid sugar solution prepared by using malt or the like. Alternatively, the unfermented beer-taste beverage may be produced, without fermentation by yeast, by adding carbon dioxide gas to an aqueous solution prepared without use of malt or the like.

In the general preparation of an unfermented beer-taste beverage using malt or the like, hot water and, if necessary, starch such as rice or corn starch are first added to a ground product or the like of malt or the like, and then the materials are mixed with each other and heated. Thus, the starch is saccharified by utilizing manly the enzymes of malt. The liquid sugar solution is filtered to obtain a filtrate. Then, for example, auxiliary ingredients, such as saccharides, cereal syrups, cereal extracts, dietary fibers, fruit juices, bitter flavoring agents, pigments, and hops, are added to the filtrate, and the mixture is boiled.

As for the conditions for boiling the liquid sugar solution containing hops, the boiling is conducted preferably at a temperature of 100° C. or above for about 60 minutes to 90 minutes. By the boiling at a high temperature for a certain period, a acids in the hops can be converted into iso-α acids.

The ingredients used in the present invention, including the ground product of malt, the starch such as rice or corn starch, the liquid sugar containing a carbon source, a nitrogen source as an amino acid-containing material other than barley and malt, and the like, are not particularly limited, and those ordinary used in production of conventional beer-taste beverages can be used in amounts ordinary employed.

After boiling, deposits such as sediment of the hops are removed from the solution to which these ingredients are added, and carbon dioxide gas is added to the solution. Thus, a target unfermented beer-taste beverage can be obtained.

When the unfermented beer-taste beverage is prepared without use of malt or the like, the unfermented beer-taste beverage may be prepared by preparing a liquid sugar solution by using an ingredient of cereals and/or beans and an enzyme preparation capable of hydrolyzing starch and proteins, and adding carbon dioxide gas to this liquid sugar solution without fermentation by yeast. In the case of the unfermented beer-taste beverage prepared without use of malt or the like, the same auxiliary ingredients as those used for the unfermented beer-taste beverage prepared by using malt or the like can be used.

In addition, the unfermented beer-taste beverage of the present invention may be prepared not by the method in which carbon dioxide gas is added in the gas state to an ingredient solution, but by a method in which a thick ingredient solution is prepared, and then carbonated water is added thereto. This method is carried out in ordinary processes for production of soft drinks. Hence, the unfermented beer-taste beverage can be prepared in a simple manner without use of a fermentation facility.

Flavor Composition Containing Sulfur-Containing Compound

In the method for producing an unfermented beer-taste beverage of the present invention, a flavor composition containing a sulfur-containing compound is added to the unfermented beer-taste beverage to achieve a predetermined level of the content of the sulfur-containing compound. Conventionally, sulfur-containing compounds in beer or beer-taste beverages have been considered to cause the unpleasant odor generated upon irradiation with sunlight ("skunky flavor", "light-struck flavor", or "sunstroke flavor") (for example, see Japanese Patent Application Publication No. Sho 59-179058). For this reason, it has been attempted to reduce the content of sulfur-containing compounds, in particular, 3-methyl-2-butene-1-thiol and the like, as much as possible to obtain a good flavor in the cases of ordinary beer and beer-taste beverages.

However, the inventors of the present invention have found that, contrary to the conventional common knowledge, addition of a sulfur-containing compound makes it possible to provide an excellent beer-like fermentation flavor to an unfermented beer-taste beverage. In other words, unexpectedly, the inventors have found that a good fermentation flavor can be provided also to an unfermented beer-taste beverage by adding, at a predetermined concentration, a sulfur-containing compound such as 3-methyl-2-butene-1-thiol or 3-methyl-2-butanethiol to an unfermented beer-taste beverage, while the generation of the unpleasant odor is suppressed.

Here, the flavor composition may be added to the unfermented beer-taste beverage at any stage. For example, the flavor composition may be added before the saccharification of the ingredient solution such as wort, or may be added before, during, or after the boiling of the liquid sugar solution. It is particularly preferable to add the flavor composition immediately before the packaging of the product. In addition, when hops are added in the method for producing an unfermented beer-taste beverage of the present invention, the flavor composition may be added simultaneously with the hops, or may be added separately from the hops.

In the present invention, the sulfur-containing compound contained in the flavor composition to be added to the unfermented beer-taste beverage is preferably a thiol group-containing volatile substance. The thiol group-containing volatile substance is not particularly limited, as long as the thiol group-containing volatile substance is a sulfur-containing compound contained in beers and the like. Examples of the thiol group-containing volatile substance include compounds such as 3-methyl-2-butene-1-thiol, 3-methyl-2-butanethiol, 3-methyl-1-butanethiol, and 2-methyl-1-butanethiol. Of these thiol group-containing volatile substances, 3-methyl-2-butene-1-thiol and 3-methyl-2-butanethiol are preferably used as the sulfur-containing compound, from the viewpoint that a good fermentation flavor can be provided to the unfermented beer-taste beverage, while the generation of the unpleasant odor is suppressed. These sulfur-containing compounds may be used alone or as a mixture of two or more. In addition, the flavor composition may be a mixture of the sulfur-containing compound with a component other than the sulfur-containing compound, or may contain only the sulfur-containing compound.

When the flavor composition containing the sulfur-containing compound is added in the method for producing an unfermented beer-taste beverage of the present invention, the amount of the flavor composition added is an added amount with which the concentration of the sulfur-containing compound in the unfermented beer-taste beverage is $1 \times 10^2$ ppt or more but $1 \times 10^3$ ppt or less, and preferably an added amount with which the concentration is $2 \times 10^2$ ppt or more but $5 \times 10^2$ ppt or less. By adding the flavor composition to the unfermented beer-taste beverage in the above-described range of the added amount, an unfermented beer-taste beverage being excellent in palatability and having excellent beer-likeness and a good fermentation flavor can be provided.

In the method for producing an unfermented beer-taste beverage of the present invention, the concentration of copper ions in the unfermented beer-taste beverage is preferably adjusted to 0.1 ppm or less.

In the production of beer, the pH is adjusted, in general, to around 5 by using a pH adjusting agent such as lactic acid after completion of boiling, in order to form appropriate hot trub. After that, organic acids such as lactic acid are produced by yeast in a fermentation step, and the pH of the beer is lowered to about 4. However, no organic acids are formed by yeast in a method for producing an unfermented beer-taste beverage involving no fermentation step. Hence, in general, the pH of the beer is lowered to about 4 no later than the completion of the boiling to achieve a beer-like flavor and to improve the microorganism resistance.

Here, some boiling apparatuses used for producing beer employ copper, which has a high thermal conductivity, for a heating portion. Copper is known to be dissolved into a solution at a low pH, and this tendency is particularly remarkable in an acidic solution with a pH of 4 or lower. In general, even when a solution with a pH of about 5 is brought into contact with a container including copper, copper does not dissolves thereinto. However, when a solution with a pH of 4 or lower is brought into contact with a solution including copper, copper is more likely to dissolve thereinto. The sulfur-containing compound is removed from the unfermented beer-taste beverage by a reaction with copper ions. Hence, when a container including copper is used as the boiling container, pH adjustment is preferably conducted after the boiling step.

The unfermented beer-taste beverage of the present invention is unfermented, and contains no alcohol. However, the unfermented beer-taste beverage can be converted to an alcoholic beverage by adding alcohol thereto. The alcohol which can be added to the unfermented beer-taste beverage is not limited, and examples thereof include alcohol for material, beer, Shochu (Japanese distilled beverages), Awamori (an alcoholic beverage indigenous to Okinawa), whiskeys, brandies, vodkas, rums, tequilas, gins, spirits, and the like. The amount of the alcohol added can be adjusted as appropriate in consideration of the final alcohol concentration of the unfermented beer-taste beverage. The alcohol may be added to the unfermented beer-taste beverage at any stage.

Unfermented Beer-Taste Beverage

An unfermented beer-taste beverage of the present invention comprises a sulfur-containing compound at $1 \times 10^2$ ppt or more but $1 \times 10^3$ ppt or less. As described above, an unfermented beer-taste beverage being excellent in palatability and having excellent beer-likeness and a good fermentation flavor can be provided by causing an unfermented beer-taste beverage to contain the sulfur-containing compound at the above-described content.

The content of the sulfur-containing compound is $1 \times 10^2$ ppt or more but $1 \times 10^3$ ppt or less, and more preferably $2 \times 10^2$ ppt or more but $5 \times 10^2$ ppt or less. In addition, a thiol group-containing volatile substance is preferably used as the sulfur-containing compound. For example, compounds such as 3-methyl-2-butene-1-thiol, 3-methyl-2-butanethiol, 3-methyl-1-butanethiol, and 2-methyl-1-butanethiol can be used. Of these compounds, 3-methyl-2-butene-1-thiol and 3-methyl-2-butanethiol are preferably used as the sulfur-containing compound, from the viewpoint that a good fermentation flavor can be provided to the unfermented beer-taste beverage, while the generation of the unpleasant odor is suppressed.

The use of malt or the like is optional for the unfermented beer-taste beverage of the present invention. When malt or the like is used, it is preferable to prepare, for example, an unfermented beer-taste beverage to which a saccharified liquid obtained by saccharifying starch such as rice or corn starch is optionally added in addition to a ground product or the like of malt or the like, and various auxiliary ingredients are further added. Examples of auxiliary ingredients added to the saccharified liquid include dietary fibers, and hops and/or bitter flavoring agents. When the unfermented beer-taste beverage contains hops or the bitter flavoring agent, the unfermented beer-taste beverage is provided with a moderate bitter taste, and exhibits a beer-like taste and flavor.

Note that a conventionally known bitter flavoring agent selected from bitter taste substances derived from hops, caffeine, Gentian extract, peptides, theobromine, naringin, *Picrasma quassioides* extract, worm wood extract, Redbark cinchona extract, and the like can be used as the bitter flavoring agent.

EXAMPLES

Example 1: Unfermented Beer-Taste Beverage to which 3-Methyl-2-butene-1-thiol (MBT) was Added Into a mash vessel, 30 kg of ground malt and 100 L of hot water were introduced, and protein rest and saccharification were carried out at temperatures in the range from 50° C. to 76° C. This saccharified liquid was filtered with a lauter, which was a filtration tank. After that, the liquid was transferred to a boiling kettle, and 10 kg of auxiliary ingredients mainly containing liquid sugar and 50 g of hops were added to this liquid. The volume of the liquid was adjusted to 160 L, and the liquid was boiled for 60 minutes. After the boiling, hot water was added in an amount equal to the amount of evaporated water. After hot trub was removed in a whirlpool tank, the liquid was cooled to 3° C. with a plate cooler. Thus, 170 L of cool wort was obtained. This cool wort was diluted by adding degassed water, and filtered through diatomaceous earth. Thus, clear wort was obtained. Carbon dioxide gas was dissolved in the wort to achieve a gas volume of 2.9. Thus, an unfermented beer-taste beverage containing no alcohol was obtained.

A flavor composition containing a sulfur-containing compound, namely 3-methyl-2-butene-1-thiol, was added to the unfermented beer-taste beverage at concentrations in the resultant unfermented beer-taste beverages of 25 ppt, 50 ppt, 100 ppt, 200 ppt, 500 ppt, and 1000 ppt, respectively. Then, blinded sensory evaluation was conducted thereon by 5 panelists in a blind manner.

Note that the sensory evaluation was carried out in terms of beer-likeness, fermentation flavor, and palatability based on the five evaluation criteria shown below. Table 1 shows the results. Note that each numeric value in the table shows an average value of evaluation data of each group.

[Evaluation Criteria]
5: noticed very strongly
4: noticed strongly
3: noticed
2: noticed slightly
1: not noticed

TABLE 1

| | Concentration of sulfur-containing compound (ppt) | | | | | | |
|---|---|---|---|---|---|---|---|
| | 0 | 25 | 50 | 100 | 200 | 500 | 1000 |
| Beer-likeness | 2.2 | 2.0 | 2.6 | 4.2 | 4.4 | 3.8 | 3.0 |
| Fermentation flavor | 1.6 | 2.0 | 2.8 | 4.2 | 4.8 | 4.4 | 3.0 |
| Palatability | 2.0 | 1.8 | 2.4 | 4.6 | 4.0 | 3.4 | 2.0 |

Example 2: Unfermented Beer-Taste Beverage to which 3-Methyl-2-butanethiol was Added An unfermented beer-taste beverage was produced, and sensory evaluation was carried out in the same manner as that in Example 1, except that 3-methyl-2-butanethiol was used as the sulfur-containing compound instead of 3-methyl-2-butene-1-thiol. Table 2 shows the results. Note that each numeric value in the table shows an average value of evaluation data of each group.

TABLE 2

| | Concentration of sulfur-containing compound (ppt) | | | | | | |
|---|---|---|---|---|---|---|---|
| | 0 | 25 | 50 | 100 | 200 | 500 | 1000 |
| Beer-likeness | 1.8 | 2.2 | 2.4 | 3.8 | 3.6 | 3.4 | 2.8 |
| Fermentation flavor | 1.8 | 1.8 | 2.6 | 4.0 | 4.4 | 4.4 | 3.4 |
| Palatability | 2.0 | 1.8 | 2.6 | 4.0 | 3.6 | 3.8 | 1.8 |

As is apparent from the results of Tables 1 and 2, the addition of the sulfur-containing compounds at $1 \times 10^2$ ppt or more improved evaluations in terms of beer-likeness and fermentation flavor, and consequently greatly improved the palatability.

Reference Example 1: MBT Contents in Commercially Available Unfermented Non-Alcohol Beers Three commercially available unfermented non-alcohol beer products (A, B, and C), and seven commercially available beer products (D, E, F, G, H, I, and J) were measured for the content of 3-methyl-2-butene-1-thiol (MBT) according to the method of Kishimoto et al., (Kishimoto, T. et al., Odorants comprising hop aroma of beer: hop-derived odorants increased in the beer hopped with aged hops, Proceedings of the 31st EBC Comgress, Venice 2007). Table 3 shows the results.

TABLE 3

| | A | B | C | D | E | F | G | H | I | J |
|---|---|---|---|---|---|---|---|---|---|---|
| MBT (ppt) | 9.3 | 13.3 | 0.6 | 4.3 | 4.9 | 3.1 | 5.6 | 8.6 | 2.4 | 8.6 |

As is apparent from Table 3, the contents of 3-methyl-2-butene-1-thiol in all of the unfermented non-alcohol beer products and the beer products were less than $1 \times 10^2$ ppt.

Example 3: Relationship Between Concentrations of Copper Ions and Sulfur-Containing Compound in Unfermented Beer-Taste Beverage Into a mash vessel, 30 kg of ground malt and 100 L of hot water were introduced, and protein rest and saccharification were carried out at temperatures in the range of 50° C. to 76° C. This saccharified liquid was filtered with a lauter, which was a filtration tank. After that, the liquid was transferred to a boiling kettle, and 10 kg of auxiliary ingredients mainly containing liquid sugar and 50 g of hops were added to this liquid. The volume of the liquid was adjusted to 160 L, and the liquid was boiled for 60 minutes. After the boiling, hot water was added in an amount equal to the amount of evaporated water, and lactic acid was added thereto to adjust the pH to 3.8. After hot trub was removed in a whirlpool tank, the liquid was cooled to 3° C. with a plate cooler. Thus, 170 L of cool wort was obtained. This cool wort was diluted by adding degassed water, and filtered through diatomaceous earth. Thus, clear wort was obtained. Carbon dioxide gas was dissolved therein to achieve a gas volume of 2.9. Thus, an unfermented beer-taste beverage containing no alcohol was obtained.

MBT was added at 400 ppt to this unfermented beer-taste beverage. As copper ions, copper sulfate was added at 0.01 ppm, 0.03 ppm, 0.05 ppm, 0.1 ppm, or 0.5 ppm. Then, the concentrations of MBT and copper ions after mixing were measured. Note that the concentrations of copper ions after addition to the unfermented beer-taste beverage were measured by inductively coupled plasma mass analysis (ICP-MS analysis). Table 4 shows the results.

TABLE 4

| Cu (ppm) | 0.01 | 0.03 | 0.05 | 0.1 | 0.5 |
|---|---|---|---|---|---|
| MBT (ppt) | 420.6 | 356.5 | 250.2 | 130.6 | 3.9 |

As is apparent from Table 4, when the concentration of copper ions was 0.5 ppm or higher, the MBT concentration was remarkably lowered, so that the effect of the present invention was not obtained.

Example 4: Timing of pH Adjustment and Copper Ion Concentration in Solution

Into a mash vessel, 30 kg of ground malt and 100 L of hot water were introduced, and protein rest and saccharification were carried out at temperatures in the range form 50° C. to 76° C. This saccharified liquid was filtered with a lauter, which was a filtration tank. After that, the liquid was transferred to a boiling kettle including copper in an overheating portion, and 10 kg of auxiliary ingredients mainly containing liquid sugar and 50 g of hops were added to this liquid. The amount of the liquid was adjusted to 160 L, and the mixture was boiled for 60 minutes. After the boiling, hot water was added in an amount equal to the amount of evaporated water. Then, (a) lactic acid was added to the mixture in the boiling kettle to adjust the pH to 3.8, or (b) lactic acid was added to the mixture in a whirlpool tank to adjust the pH to 3.8. After hot trub was removed in a whirlpool tank, the liquid was cooled to 3° C. with a plate cooler. Thus, 170 L of cool wort was obtained. This cool wort was diluted by adding degassed water, and then filtered through diatomaceous earth. Thus, clear wort was obtained. Carbon dioxide gas was dissolved therein to achieve a gas volume of 2.9. Thus, each unfermented beer-taste beverage containing no alcohol was obtained. Table 5 shows the concentration of copper ions in each of the unfermented beer-taste beverages of (a) and (b).

TABLE 5

| | Wort | |
|---|---|---|
| | (a) pH adjustment in boiling kettle | (b) pH adjustment in whirlpool |
| Cu (ppm) | 0.48 | 0.04 |

The invention claimed is:

1. A method for producing a non-alcoholic beer-taste beverage comprising:
   preparing a liquid sugar solution; and
   adding a sulfur-containing compound to the liquid sugar solution to obtain a non-alcoholic beer-taste beverage, wherein:
   a content of the sulfur-containing compound is $1 \times 10^2$ ppt or more and $1 \times 10^3$ ppt or less,
   the sulfur-containing compound is at least one of 3-methyl-2-butene-1-thiol and 3-methyl-2-butanethiol, and
   the method does not include fermentation of the liquid sugar solution.

2. The method according to claim 1, wherein said adding sulfur-containing compound comprises adding the sulfur-containing compound in an amount of $2 \times 10^2$ ppt or more and $5 \times 10^2$ ppt or less.

3. The method according to claim 1, further comprising adjusting a concentration of copper ions in the liquid sugar solution to 0.1 ppm or less.

4. The method according to claim 3, further comprising boiling the liquid sugar solution.

5. The method according to claim 4, further comprising adjusting a pH of the liquid sugar solution to 4 or less, wherein said boiling comprises boiling the liquid sugar solution with a container including copper, and wherein said adjusting concentration of copper ions is performed after said boiling.

6. The method according to claim 5, further comprising removing hot trub from the liquid sugar solution in a whirlpool, after said boiling, wherein said adjusting pH comprises adjusting pH of the liquid sugar solution in the whirlpool.

7. The method according to claim 1, wherein said preparing liquid sugar solution comprises using a malt.

8. The method according to claim 1, wherein said preparing liquid sugar solution comprises using a cereal and/or bean without using a malt.

9. The method according to claim 1, further comprising adding a hop into the liquid sugar solution.

\* \* \* \* \*